Nov. 5, 1929.  M. C. GONZALEZ  1,734,292
AIR COMPRESSOR
Filed May 4, 1928
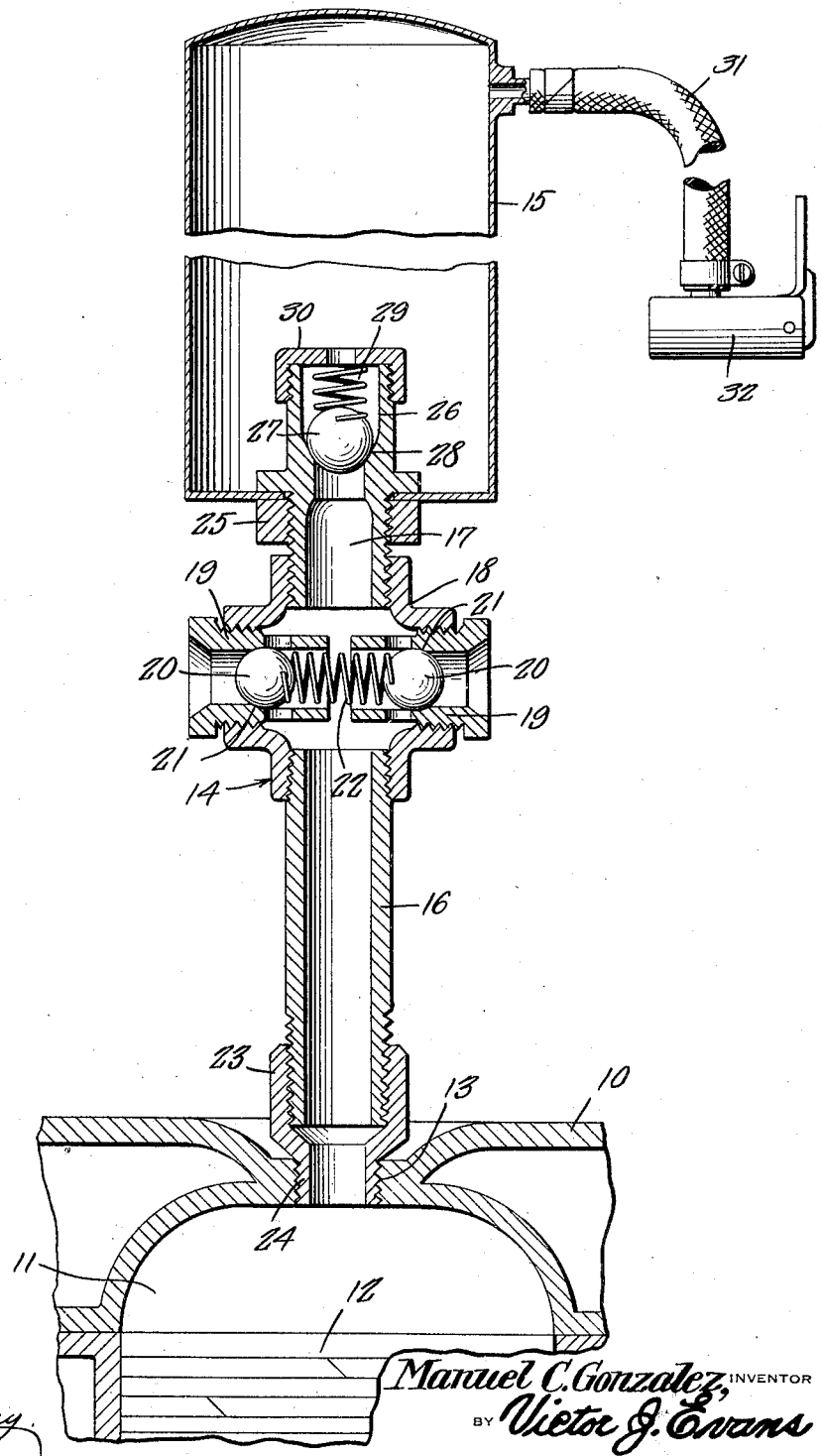

Patented Nov. 5, 1929

1,734,292

UNITED STATES PATENT OFFICE

MANUEL C. GONZALEZ, OF MEXICO, MEXICO

AIR COMPRESSOR

Application filed May 4, 1928. Serial No. 275,174.

This invention relates to devices for inflating automobile tires and has for an object the provision of means which may be removably mounted upon the engine of an automobile whereby the latter may be utilized as a compressor to supply air for the inflation of the tires of the automobile.

Another object of the invention is the provision of an air storage tank from which air may be supplied to a tire, combined means being provided for supporting the tank, drawing air into the engine cylinder for compression, and directing said air into the tank.

Another object of the invention is the provision of means of the above character wherein the air pipe or conduit is formed of standard pipe sections and connections, so that the device may be manufactured at a low cost.

With the above and other objects in view, the invention further includes the following novel features and details of construction, to be hereinafter more fully described, illustrated in the accompanying drawing and pointed out in the appended claims.

In the drawing, the figure shown is a sectional view illustrating the invention.

Referring to the drawing in detail wherein like characters of reference denote corresponding parts, the reference character 10 indicates a portion of the block of an engine having a cylinder 11 within which operates a piston 12, while the cylinder is provided in its head with a threaded opening 13 for receiving the usual spark plug (not shown).

Communicating with the cylinder 11 through a pipe or conduit 14 is an air storage tank 15. The pipe 14 is formed of standard pipe sections and fittings and includes a pipe section 16 which is connected to a special pipe section 17 by means of a coupling 18.

The coupling 18 is provided with oppositely located axially aligned openings which are internally threaded for engagement with cages 19 which accommodate valves 20. The cages are provided with seats 21 which are engaged by the valves 20 and the latter are of spherical shape. A spring 22 which is common to both of the valves, yieldingly holds the valves seated.

The lower end of the pipe section 16 has threadedly mounted thereon a nipple 23 and this nipple is provided with a reduced threaded extremity 24 which is removably engaged within the spark plug opening 13 so as to provide communication between the pipe 14 and the cylinder 11. This nipple 23 may be removed from the pipe 16 and a different nipple substituted so as to accommodate the pipe to engines having different size spark plug openings.

The pipe section 17 extends into the tank 15 and is secured thereto through the medium of a nut 25. The extended end of the section 16 provides a cage 26 for a spherical valve 27 which is yieldingly held upon a seat 28 by means of a spring 29. This spring bears against a cap 30 and this cap is provided with an air inlet opening.

In the use of the invention, a spark plug may be removed from one of the engine cylinders and the nipple at the lower end of the pipe 16 may be substituted. Upon the in stroke of the piston air is drawn inward past the check valves 20, the valve 27 remaining seated. When the piston 12 moves in an opposite direction, the valves 20 will be seated and air will be forced past the valve 27 into the tank 15.

Communicating with the interior of the tank 15 is one end of a hose 31. The opposite end of this hose has secured thereto a member 32 for connection with the valve of a tire.

As will be seen from the drawing and description of the invention, the pipe 14 functions as an air intake pipe; as an air conduit for conveying air from the cylinder 11 to the tank 15, and as a support for the tank.

The invention is susceptible of various changes in its form, proportions and minor details of construction and the right is herein reserved to make such changes as properly fall within the scope of the appended claims.

Having described the invention what is claimed is:

1. In combination, an engine cylinder having a threaded opening for receiving a spark plug and a piston operating within the cylinder, a storage tank, a pipe having one end mounted upon the cylinder and communicating therewith through the spark plug opening and its opposite end secured to and communicating with the tank, said pipe providing a combined air conduit and tank support, a check valve at the tank end of the pipe, check valve controlled communication between the pipe and atmosphere, and a hose having one end communicating with the tank with means at the other end of the hose for attachment to the valve of a tire.

2. In combination, an engine cylinder having a threaded opening for receiving a spark plug and a piston operating within the cylinder, a storage tank, a combined air conduit and supporting pipe providing communication between the cylinder and tank, said pipe including separate sections, a union connecting the sections, said union having oppositely located bores disposed at right angles to the pipe and communicating therewith, a valve cage mounted within each bore, each cage having a valve seat therein, spring influenced valves engaging the seats and providing check valves for controlling the entrance of air into the pipe, means connecting one end of the pipe to the tank, a check valve for controlling communication between the pipe and tank, means connecting the other end of the pipe with the engine cylinder and a hose having one end communicating with the tank with means at the other end of the hose for attachment to the valve of a tire.

3. In combination with an engine, an air storage tank, valve controlled means providing communication between the tank and the engine cylinder, whereby operation of the engine will force air under pressure into the tank, and an air hose having one end in communication with the tank with means at the opposite end of the hose for attachment to the valve of a tire.

In testimony whereof I affix my signature.

MANUEL C. GONZALEZ.